No. 878,952. PATENTED FEB. 11, 1908.
H. HERTZBERG & M. J. WOHL.
ELECTRICALLY HEATED SOLDERING AND BRANDING IRON.
APPLICATION FILED APR. 5, 1907.
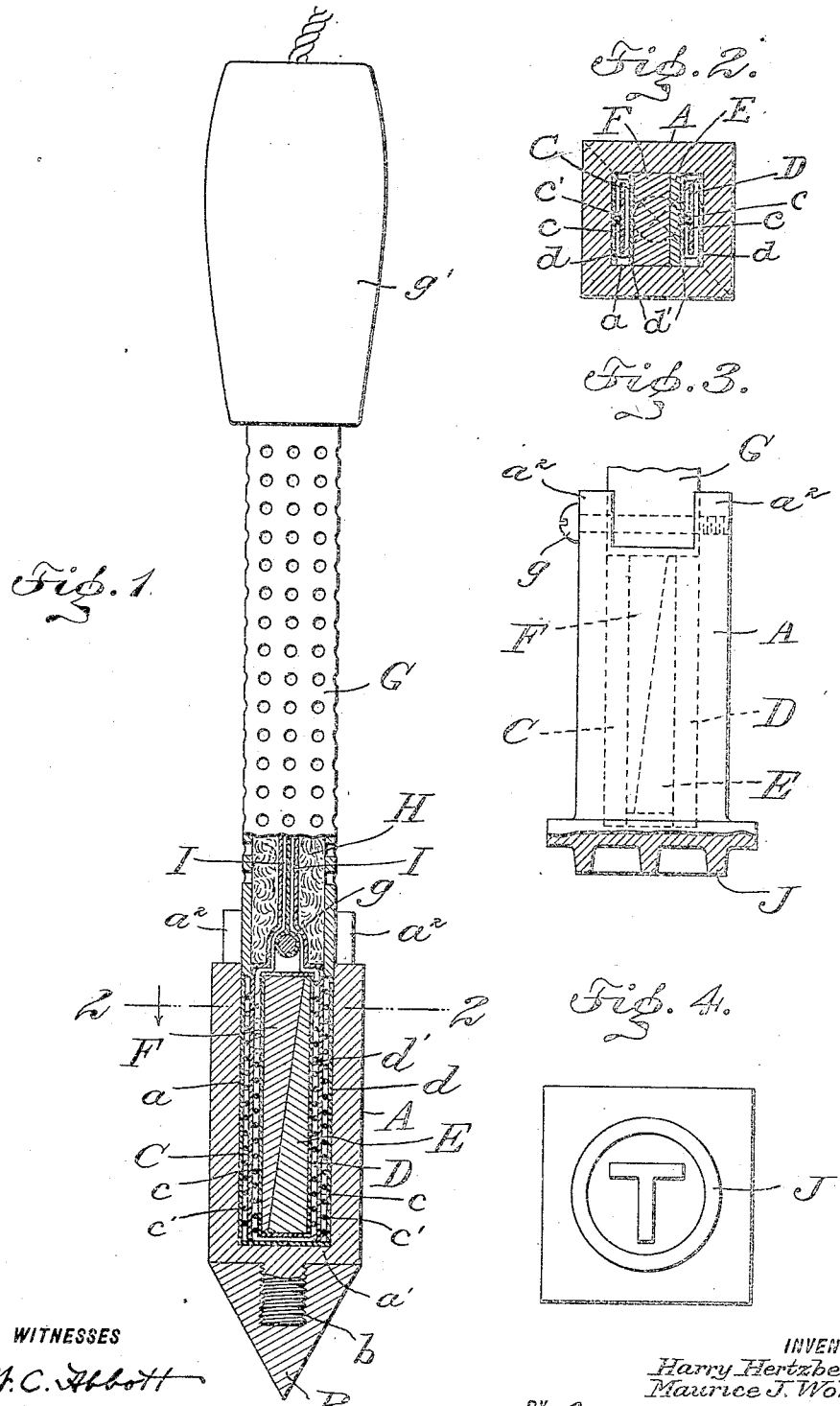

UNITED STATES PATENT OFFICE.

HARRY HERTZBERG AND MAURICE J. WOHL, OF NEW YORK, N. Y., ASSIGNORS TO ABBOT AUGUSTUS LOW, OF HORSESHOE, NEW YORK.

ELECTRICALLY-HEATED SOLDERING AND BRANDING IRON.

No. 878,952.

Specification of Letters Patent.

Patented Feb. 11, 1908.

Application filed April 5, 1907. Serial No. 366,530.

*To all whom it may concern:*

Be it known that we, HARRY HERTZBERG and MAURICE J. WOHL, citizens of the United States, residing at New York, borough of Brooklyn, county of Kings, and State of New York, have invented certain new and useful Electrically-Heated Soldering and Branding Irons of which the following is a specification.

This invention is a soldering iron or branding iron in which we employ means for electrically heating a mass of metal to a required temperature for the operation of melting solder, or for branding purposes, or for other purposes in various arts.

The object of this invention is to heat a mass of metal to a required temperature in a brief time, and, further, to keep the device in service with a minimum consumption of electrical current, whereby the implement or device may be brought quickly to a condition for service, and said device is rendered economical in the consumption of the current.

The broadly new feature of the present invention is a means for securing good mechanical contact between a mass of heat absorbing metal and an electrically-operated heater or resistance, the latter being, preferably, inclosed within or by said mass of metal.

In the accompanying drawings, we have illustrated one practical embodiment of the invention, but the construction shown therein is to be understood as illustrative only, and not as defining the limits of the invention.

Figure 1 is a longitudinal section, partly in elevation, of a soldering iron constructed in accordance with this invention; Fig. 2 is a cross section on the line 2—2 of Fig. 1. Fig. 3 is a side elevation partly in section representing a branding iron embodying the invention, and Fig. 4 is an end view of the branding iron shown in Fig. 3.

In the construction shown in Figs. 1 and 2 of the drawings we have represented a soldering iron, consisting of a body or mass of heat-absorbing metal A, an electrical resistance rheostat inclosed within or by said mass of metal, means whereby said electrical resistance or rheostat is held in close mechanical contact with the body or mass of metal, a shank attached to said body or mass of metal, and means whereby a current of electrical energy may be supplied to and conveyed away from the electrical resistance or rheostat.

The body or mass A may be composed of any suitable or appropriate material, but the material which we prefer to employ is copper because of its well known capacity to heat up quickly and to absorb and retain the heat. As shown, the body A is intended to be cast in a single piece, and it is preferred to provide said body with a chamber, $a$, which chamber is open at one end of the body and is closed at the opposite end by a solid wall $a'$. At the open end of the body, it is preferred to provide tongues $a^2$ on two sides of the body, and at the closed end said body is formed with a tenon $b$, the latter being externally threaded and projecting beyond the wall $a'$ which forms said closed end of the body.

The soldering iron of our invention is provided, preferably, with a removable tip B, the latter being composed of suitable material, such as copper, said tip being provided with a female threaded socket into which is screwed the tenon $b$. The tip B may be of any preferred form, such as the tapering form shown in Fig. 1, and said tip is screwed on the tenon so that it will have good contact with the body or mass of metal A. The tip is adapted to be heated quickly by absorbing heat from the body A, thus making the device very useful in soldering operations. Should the tip become coated with a metallic film to such an extent as to impair its usefulness, it may be readily detached from the iron, and replaced by a new or fresh tip. Another advantage of this construction is that pointed tips, flat edged tips, or tips of any preferred form, may be used in connection with one and the same body A.

The chamber $a$ of the body is adapted to contain an electrical rheostat or heating appliance, and if desired said body may be equipped with a plurality of heating coils. In Figs. 1 and 2 we have shown the soldering iron body A as provided with two spaced heating elements C, D, the same being arranged in contact with the opposite walls of the chamber $a$. Said heating elements may be of any well known construction, but we prefer to construct each heating element in a manner to expose a relatively large area of an electrical resistance to good mechanical contact with the mass of metal, and to electrically insulate said resistance from the mass of metal. Each heating element consists of a core $c$, a resistance wire or ribbon $c'$ coiled or wrapped on said core $c$, and layers $d, d'$ of insulating material applied to the opposite sides of the core $c$ and in engagement with the winding of the resistance wire or ribbon $c'$ thereon.

As shown in Figs. 1 and 2, the layers $d$ of the heating elements C, D, are in contact with the opposite walls of the metallic body or mass A, while the other layers $d'$ of said heating elements C, D, are opposed to each other and separated within the chamber $a$ of said body. This arrangement separates the two heating elements C, D, and the resistances $c'$ of said heating elements are next to the opposite walls of said body.

It is important to secure good mechanical contact of the heating elements with the metallic mass in order that the heat developed in the electrical resistances $c'$ of the plurality of heating elements may be absorbed quickly and to the best advantage by the metallic mass. For securing this end, we have provided novel means for separating the heating elements and forcing them tightly against the side walls of the body or mass, said separating means being exposed to the heat developed by the electrical resistances and being also in contact with the body or mass A for conducting heat thereto.

The means referred to is embodied preferably in the form of coöperating metal wedges E, F, the same being composed preferably of heat absorbing and conducting material, such as copper, each wedge being provided with an inclined side or face and with a flat straight face or side.

In assembling the parts composing the soldering iron, the heating element C, D, are placed within the chamber $a$ of the body, the wedge E is inserted large end foremost into the chamber so that its flat side or face is in engagement with the layer $d'$ of the heating element D, and then the other wedge F is inserted, its flat side or face being in engagement with the inner layer $d'$ of the heating element C. The wedge F engages with the wedge E, and owing to the inclination of the faces of said wedges, the operation of driving home or forcing the wedge F to its proper position causes the two wedges to press the heating element C, D, into good mechanical contact with the opposite side walls of the body A. The wedges are pressed tightly together, and at their edges they engage with other walls of the body A, as shown in Fig. 2, whereby the edges are adapted to be heated by the heat developed in the resistances $c'$ of the two heating elements, and said wedges transmit or communicate the heat absorbed thereby to the walls of the chambered body or mass A.

It may be stated that we prefer to construct each heating element C, D, with a core $c$ composed of a thin layer of mica, and that the insulating layers $d, d'$ are composed also of mica. This material is advantageous for the reason that it permits of the ready transmission of the heat of the electrical resistance wire or ribbon $c'$ and serves, also, to electrically insulate the resistance wire or ribbon from the body or mass A and the wedge which engages with said heating element.

With the body A is associated suitable means for conveniently handling and manipulating it. As shown in Fig. 1, we employ a hollow stock G, the same being composed of a perforated metallic tube. One end of the tube is inserted between the tongues $a^2$ of the body, and through said stock and the aforesaid tongues is passed a fastening screw $g$, thus mechanically attaching the stock to the body A. Said stock is provided with a suitable handle $g'$ composed preferably of a material which is a non-conductor of heat, and the stock is lined with asbestos, indicated at H, or other non-conductor of heat. The current is supplied to the electrical heaters by suitable conductors I which are inclosed by the lining H. When the resistances of the electrical heating elements are connected in series, as shown in Fig. 1, one conductor is in circuit with the resistance of one heating element and the other conductor is connected to the resistance of the other heater, whereby the current of electric energy supplied by one conductor passes through the heating elements and is conveyed away by the other conductor. We do not desire, however, to confine ourselves to the arrangement of a plurality of electrical heating elements in series, for the reason that said heating elements may be connected in multiple.

In Figs. 3 and 4 of the drawings we have shown our invention as embodied in a branding iron. The body A' of said iron is provided with electric heating elements and the coöperating wedges constructed as heretofore described and represented in Figs. 1 and 2. The body A' of said branding iron is provided with a branding member J, the latter being formed with suitable words, characters, figures, or other marks to be branded on an appropriate surface. The branding member J is employed in lieu of the removable tip D of the soldering iron, and this member may be integral with the body A' or it may be secured detachably thereto.

Having thus fully described the invention, what we claim as new, and desire to secure by Letters Patent is:—

1. In a device of the class described, a chambered body or mass of metal, a heating element comprising a core of insulating material and a winding on said core, said heating element being within said body or mass of metal, wedging means for clamping the heating element into mechanical contact with said body or mass of metal, and means for electrically insulating the heating element from the body or mass of metal and the wedging means.

2. In a device of the class described, a chambered body or mass of metal, a plurality of electrical heating elements therein, a wedging means for clamping the individual heating elements into contact with opposite walls of the chamber in said body or mass of metal.

3. In a device of the class described, a chambered body or mass of metal, a plurality of spaced electrical heating elements therein, each heating element having a coil independent of the coil of the other heating element, and interposed wedging means between the heating elements for clamping the latter into close mechanical contact with opposite walls of the chamber in said body or mass of metal.

4. In a device of the class described, a hollow body or mass of metal, a plurality of electrical heating elements therein, and interposed coöperating wedges for clamping said heating elements at one operation into close mechanical contact with said body or mass of metal.

5. In a device of the class described, a hollow body or mass of metal, a plurality of electrically-operated heating elements therein, and wedges for clamping said heating elements into close engagement with said body or mass of metal.

6. In a device of the class described, a hollow body or mass of metal, a plurality of electrically-operated heating elements therein, and coöperating wedges engaging with the respective heating elements for clamping them into close mechanical contact with said body or mass of metal.

7. In a device of the class described, a body or mass of metal, a heating element therein, and a plurality of coöperating wedges for clamping the heating element in close engagement with said mass of metal.

8. In a device of the class described, a body or mass of metal, a heating element therein, and a plurality of coöperating wedges engaging with the heating element, said wedges having metallic contact at their side edges with the body or mass of metal.

9. In a device of the class described, a body or mass of metal, a heating element therein, and wedging means composed of heat-conducting metal engaging on one side with the heating element, said wedging means engaging at a plurality of its edges directly with the body or mass of metal.

10. In a device of the class described, a body or mass of metal, an electrical resistance wound on a core of insulating material and inclosed within said body or mass of metal, insulating layers inclosing said resistance from metallic contact with the body or mass of metal, and wedging means opposite to one of said insulating layers and clamping said resistance into mechanical contact with the body or mass of metal.

11. In a device of the class described, a hollow mass of metal, a plurality of electrically operated heating elements therein, and coöperating wedges engaging with the metallic mass and with said heating elements.

12. In a device of the class described, a hollow mass of metal, a plurality of electrically operated heating elements therein, and coöperating metallic wedges engaging respectively with said heating elements and also having metallic contact at a plurality of their edges with said mass of metal.

13. In a device of the class described, a body or mass of metal, an electrically operated heater therein, and coöperating wedges whereby said heater is held in close contact with said body or mass of metal.

14. In a device of the class described, a chambered metallic body, an electrically operated heater in said body, and a plurality of wedges for clamping said heater into close contact with said body.

15. In a device of the class described, a chambered metallic body, an electrically operated heater in said body, and coöperating wedges engaging with said heater and with said body.

16. In a device of the class described, a chambered body, an electrical heater therein, and a plurality of wedges in mechanical contact with the body and operating to clamp said heater into close contact with said body.

17. In a device of the class described, a chambered body, a plurality of electrical heaters therein, and coöperating wedges engaging with the respective heaters for clamping them into close contact with said body.

18. In a device of the class described, a chambered body of heat absorbing metal, a plurality of electrical heaters disposed in spaced order therein, and intermediate coöperating wedges for clamping said heaters in close contact with said body.

19. In a device of the class described, a chambered body of heat absorbing metal, a plurality of electrical heaters disposed in spaced order therein, and interposed wedges engaging with each other and with the respective heaters for clamping the latter into close contact with said body.

In testimony whereof we have signed our names to this specification in the presence of two subscribing witnesses.

HARRY HERTZBERG.
  MAURICE J. WOHL.

Witnesses;
 JAS. H. GRIFFIN,
 H. I. BERNHARD.